A. VON BEAULIEU.
FREE WHEEL DEVICE.
APPLICATION FILED MAR. 29, 1918.

1,362,591.

Patented Dec. 21, 1920.

Inventor
Albert von Beaulieu
By Church & Church
his Attorneys

UNITED STATES PATENT OFFICE.

ALBERT VON BEAULIEU, OF OWEGO, NEW YORK.

FREE-WHEEL DEVICE.

1,362,591.   Specification of Letters Patent.   Patented Dec. 21, 1920.

Application filed March 29, 1918. Serial No. 225,515.

*To all whom it may concern:*

Be it known that I, ALBERT VON BEAULIEU, a citizen of the United States, residing at Owego, in the county of Tioga and State of New York, have invented certain new and useful Improvements in Free-Wheel Devices; and I do hereby declare the following to be a full, clear, and exact description of the same, reference being had to the accompanying drawings, forming part of this specification.

This invention relates to a device for coupling together two concentric members in such fashion that a positive drive to one member will be transmitted to the other member when the first member is revolved in a certain direction, but will have no action upon the second member when driven in the other direction, in the latter case providing what is known as a "free wheel."

The principal object of this invention is to provide a free wheel device which, while more efficient in operation than the previously known devices, is at the same time considerably cheaper to manufacture. A second object of the invention is to provide a means for performing the double function of securely closing the oil hole of a clutch device and maintaining the pawls of such device in contact with the ratchet teeth on the inner race member. A further object of the invention is to lower the cost of the ball bearing member by inserting fillers between the balls and by providing reversely positioned grooves in the two race members to permit the insertion of balls in the raceway while preventing their coming out in operation, these grooves permitting a simpler form of raceway.

With these and other objects in view the invention consists in certain novel arrangements and combination of parts shown in the accompanying drawings, in which—

Figure 1:
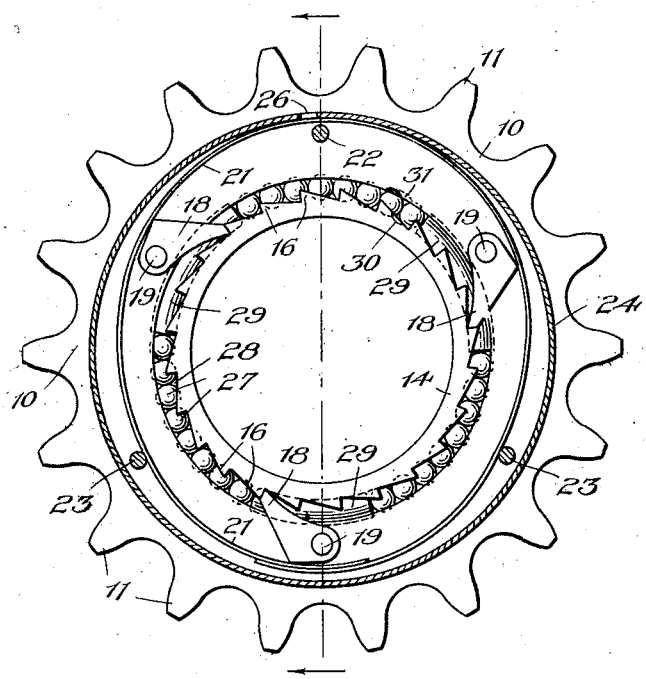
Figure 1 shows an elevation of my device in its preferred form, the dust cover being shown in cross section to more clearly show the mechanism.
Figure 2:
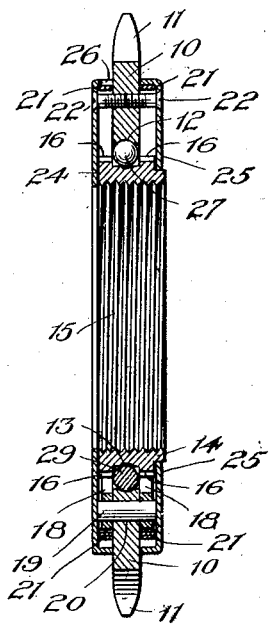
Fig. 2 is a central cross section on the line shown in Fig. 1, taken as indicated by the two arrows.

In the drawings, 10 represents a flat, flangeless sprocket wheel formed from sheet metal and provided with the usual sprocket teeth 11 on its periphery, and with a race 12 on its inner side coöperating with a similar race 13 on the inner race member or ring 14 which is threaded as at 15 to engage with the usual hub or other rotating part (not shown). On either side of the inner race is a series of ratchet teeth 16, the teeth of which are on corresponding portions of the inner race member, so as to provide symmetrical series of ratchet teeth. These ratchet teeth are engaged by a set of pawls 18, three or more in number on each side, and located away from the space occupied by the balls preferably by being pivoted on hinge pins 19 loosely fitting in holes 20 in the sprocket member. The three pawls on each side of the sprocket are held in engagement with the ratchet teeth on the inner race member by means of a single spring 21 held in place by the screws 22 and 23 which hold the dust covers 24 and 25 in place, the spring passing outside of the screw 22 but inside of the two screws 23. The outer dust cover 24 held in place by these screws is provided in its inturned periphery with an oil hole 26 located a little distance to one side of the screw 22, the latter holding the spring in such position as to effectively close the oil hole but due to the resiliency of the spring capable of yielding to permit the insertion of the spout of an oil can and to return to closed position when the spout is withdrawn. The dust caps engage the three pawl hinge pins 19 which extend entirely through the outer race member 10 and therefore avoid the necessity of having these pins headed to prevent the loss of the pawls and also hold the two springs in place.

Figure 3:
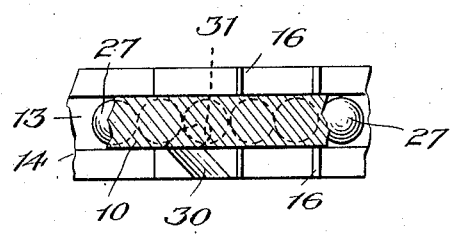
Fig. 3 is a detail view showing the grooves for inserting the balls, the top groove being shown dotted.

As best shown in Fig. 1, I provide a number of balls 27 for the raceway 28 formed by the races 12 and 13, and between certain of these balls 27 I provide filler members 29 preferably equispaced around the raceway. These fillers are slightly smaller in diameter than the balls and take no wear save that due to the extreme slight friction of contact with the grooves or races and at their ends due to contact with the proximate balls. The fillers are inserted first while the two race members are in eccentric position with respect to each other. Then as many balls as possible are inserted until the eccentricity has been reduced so that it is no longer possible to crowd the balls between the two race members. For the insertion of balls at this time the grooves 30 and 31 are provided, these grooves as best seen in Fig. 3 being at an angle to each other and so positioned that in operation the balls will pass the grooves in such direction as to tend to keep the balls in the raceway, movement in the opposite direction, which would tend to throw the balls out of the raceway, being prevented by the six simultaneously acting pawls. The balls are removed from the raceway when necessary by bringing the two grooves into registry, as shown in Fig. 3 and by forcing the balls, one at a time, first down the groove 31 and then at right angles down the groove 30. It will be necessary of course to remove a considerable number of balls before the fillers can be removed.

Particular attention is invited to the fact that all expensive manufacturing operations are avoided in this device, the usual free wheel clutches requiring expensive drop forgings which are entirely omitted in the present structure.

What is claimed is:

1. A sprocket wheel consisting of a plurality of teeth and an integral flat base portion of uniform thickness having a ball race in its inner annular face, the radius of the race being approximately half the thickness of the base portion.

2. A ball race member having a plurality of ratchet teeth and a ball race therebetween.

3. A ball race member having a plurality of symmetrical series of ratchet teeth and a ball race therebetween merging with the bottoms of the ratchet teeth.

4. In a free wheel device, a rotating member, a second rotating member within said member, pawl and ratchet means on said members, a dust cap having an oil hole and inclosing said means, and a single means within said dust cap for resiliently closing said oil hole and insuring operation of said pawl and ratchet means.

5. In combination, a ratchet member, a plurality of pawls engaging said ratchet member, a dust cap having an oil hole, and a single member for resiliently closing said oil hole and holding said pawls in engagement with said ratchet member.

6. In a ball bearing free wheel device, a pair of ball race members each having a race, pawls on one of said members and ratchet teeth on the other of said members, a dust cap protecting said pawls and having an oil hole, and a spring for resiliently closing said oil hole and holding the pawls in contact with said ratchet teeth.

7. A sprocket wheel having a ball race in its inner annular face, an inner race member having a ball race on its outer face, a series of ratchet teeth on said member, a plurality of pins loosely fitted in said sprocket wheel, a pair of pawls on each pin, one on each side of the sprocket wheel, and means carried by said sprocket wheel for maintaining the pins and pawls in place and for protecting them from dust.

ALBERT von BEAULIEU.